(12) United States Patent
Keilich et al.

(10) Patent No.: US 8,623,453 B2
(45) Date of Patent: Jan. 7, 2014

(54) METHOD FOR RESTORING ANTIMICROBIAL HYDROPHILIC COATINGS

(75) Inventors: Peter W. Keilich, South Windsor, CT (US); Mark E. Caron, Somers, CT (US)

(73) Assignee: Hamilton Sundstrand Space Systems International, Inc., Windsor Locks, CT (US)

(*) Notice: Subject to any disclaimer, the term of this patent is extended or adjusted under 35 U.S.C. 154(b) by 300 days.

(21) Appl. No.: 13/074,612

(22) Filed: Mar. 29, 2011

(65) Prior Publication Data

US 2012/0251713 A1    Oct. 4, 2012

(51) Int. Cl.
- *B05D 3/00* (2006.01)
- *B32B 43/00* (2006.01)
- *B05C 13/00* (2006.01)
- *H05B 6/46* (2006.01)
- *H05B 6/02* (2006.01)

(52) U.S. Cl.
USPC ........... 427/140; 427/142; 427/543; 427/544; 427/545; 427/557

(58) Field of Classification Search
USPC ......... 427/140, 141, 142, 545, 543, 544, 557, 427/558, 591, 592; 165/133
See application file for complete search history.

(56) References Cited

U.S. PATENT DOCUMENTS

| | | | |
|---|---|---|---|
| 3,658,581 A | | 4/1972 | Paul et al. |
| 5,141,918 A | * | 8/1992 | Hirano ........................... 505/446 |
| 5,264,250 A | * | 11/1993 | Steele et al. ................... 427/380 |
| 5,305,827 A | | 4/1994 | Steele et al. |
| 6,102,994 A | * | 8/2000 | Zhou et al. .................. 106/15.05 |
| 6,500,490 B1 | * | 12/2002 | Yan ............................. 427/376.2 |

OTHER PUBLICATIONS

Shakhashiri; Chemical of the Week, Gases of Air; www.scifun.org; Nov. 2007.*
The extended European Search Report in counterpart European Application No. 12160311 filed Mar. 20, 2012.
Waterhouse, et al. "Interaction of a polycrystalline silver powder with ozone" Surface and Interface Analysis, 2002 (33), pp. 401-409.

* cited by examiner

*Primary Examiner* — Michael Wieczorek
(74) *Attorney, Agent, or Firm* — Kinney & Lange, P.A.

(57) ABSTRACT

A method for restoring a silver oxide-containing hydrophilic coating includes heating the coating to a temperature between about 260° C. and about 540° C. and maintaining the coating at a temperature between about 260° C. and about 540° C. in an environment containing oxygen and ozone for less than 24 hours.

19 Claims, 1 Drawing Sheet

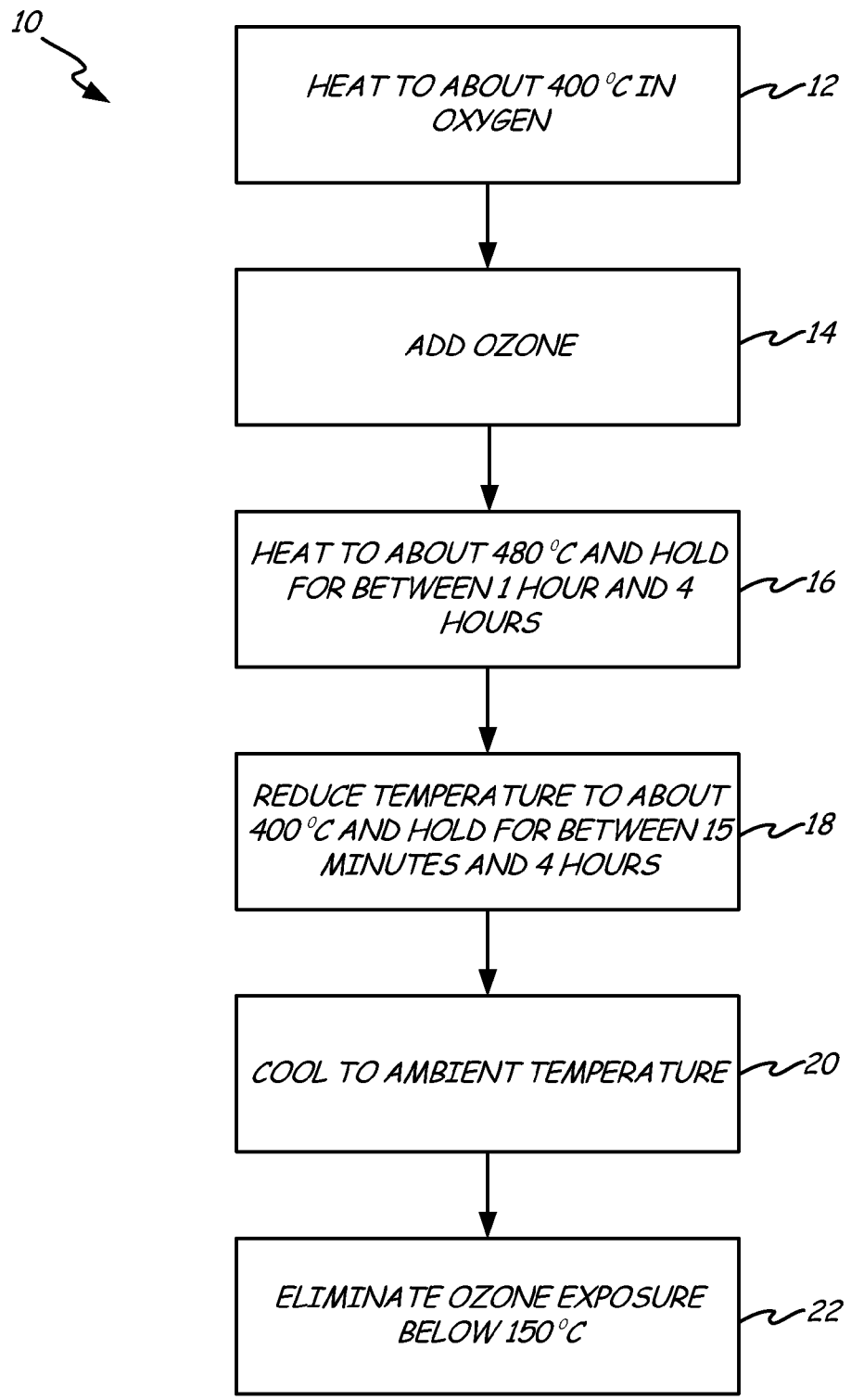

METHOD FOR RESTORING ANTIMICROBIAL HYDROPHILIC COATINGS

STATEMENT OF GOVERNMENT INTEREST

This invention was made with government support under Contract No. NAS15-10000/406748 awarded by the National Aeronautics and Space Administration. The government has certain rights in the invention.

BACKGROUND

Zero and micro gravity operation of certain equipment requires modifications from its conventional configurations. For example, heat can be removed from a fluid stream by using a conventional condensing heat exchanger (condenser). In a 1 times gravity (1g) environment, condensate (water) forms droplets on the chilled condenser and these water droplets drain to the bottom of the condenser. In a micro gravity environment, the condensate must be removed using alternate technologies. Left unchecked, these water droplets could find their way to electronic equipment and cause equipment failure. Thus, water collection and removal processes in certain micro gravity environments (e.g., the cabin of a spacecraft) are facilitated using condensing heat exchangers having hydrophilic coatings. These hydrophilic coatings minimize the formation of water droplets so that the condensate can be collected from the condenser and removed from the air stream using suction provided by a downstream water separator. The condensate water can then be reclaimed for reuse.

To prevent microbial growth within the condensate, some hydrophilic coatings are supplied with a biocide. U.S. Pat. No. 5,305,827 describes one such antimicrobial hydrophilic coating for use with condensers. This particular antimicrobial hydrophilic coating utilizes silver oxide in the form of $Ag_2O$ as the biocide. Silver oxide in the hydrophilic coating dissolves in water to produce silver ions in the form of $Ag^+$. These silver ions serve as a biocide and prevent microbial growth in the water.

During use, condensers and their coatings are exposed to contaminants in the air stream in addition to water. Some substances, such as oils, plasticizers, and silicones can contaminate hydrophilic coatings. When hydrophilic coatings become contaminated, they can lose their hydrophilic properties and become hydrophobic. Once a condenser coating loses its hydrophilicity, the collection of water from the condenser is much less efficient, which can lead to water carryover in the cabin air stream. For coatings that do not contain silver oxide, the coating can generally be heated to high temperatures (about 260° C. to over 540° C.) to burn off or "ash out" the contaminants. Once a sufficient amount of the contaminants have been ashed out, a coating's hydrophilic properties are restored and the coating is again suitable for use. With coatings that contain silver oxide, however, heating the coating to a high temperature can remove the contaminants, but may also irreversibly render the biocide ineffective. Due to the high costs of producing and deploying water-collecting condensers for spacecraft, a need exists for a method for restoring silver oxide ($Ag_2O$)-containing hydrophilic coatings of condensers that does not compromise the biocidal properties of the coating.

SUMMARY

A method for restoring a silver oxide-containing hydrophilic coating includes heating the coating to a temperature between about 260° C. and about 540° C. and maintaining the coating at a temperature between about 260° C. and about 540° C. in an environment containing oxygen and ozone for less than 24 hours.

A method for preparing a component having a silver oxide-containing hydrophilic coating includes heating the component to a first temperature between about 370° C. and about 540° C. and maintaining the component at the first temperature for between about 1 hour and about 4 hours in an environment containing oxygen and ozone to eliminate contaminants from the coating. The method also includes reducing the temperature of the component to a second temperature between about 260° C. and about 510° C. and maintaining the component at the second temperature for between about 15 minutes and about 4 hours in the environment containing oxygen and ozone.

A method for restoring a condensing heat exchanger having an antimicrobial hydrophilic coating includes heating the heat exchanger to a first temperature between about 370° C. and about 540° C. and maintaining the heat exchanger at the first temperature for less than 8 hours in an environment containing oxygen and ozone to eliminate contaminants from the coating. The method also includes reducing the temperature of the heat exchanger to a second temperature between about 260° C. and about 510° C. and maintaining the heat exchanger at the second temperature for between about 15 minutes and about 4 hours in the environment containing oxygen and ozone to reform silver oxide ($Ag_2O$).

BRIEF DESCRIPTION OF THE DRAWINGS

The FIGURE is a schematic diagram of one embodiment of a method for restoring a silver oxide-containing hydrophilic coating.

DETAILED DESCRIPTION

The present invention provides a method for restoring a silver oxide-containing hydrophilic coating. The method removes contaminants from the coating to restore its hydrophilic properties while also preventing the loss of the coating's biocidal properties. The coating is heated to an elevated temperature to "ash" contaminants out of the coating. Heating the coating in an environment of oxygen and ozone provides for the simultaneous regeneration of silver oxide. At the same time, exposure to high temperature is carefully limited to prevent silver from irreversibly integrating itself within the coating. Thus, the present invention provides for a method that removes contaminants from a coating to restore its hydrophilicity while also preventing the loss of its biocidal properties.

A means for water removal is necessary for condensing heat exchangers (condensers) used in micro gravity environments. Micro gravity environments include space stations, spacecraft and space suits. Left unmanaged, condensed water can form water droplets that have the potential to damage electronic components within the micro gravity environment. As a result, condensers in such an environment often contain a hydrophilic coating designed to wet the surfaces of the condensing heat exchanger, prevent the formation of water droplets and collect water for reuse. One example of such a hydrophilic coating is described in U.S. Pat. No. 3,658,581. The hydrophilic coating causes wetting and wicking of water, triggering the condensate to form a thin spreading film in the coating that can be later collected. The condensate can be collected by vacuum into a gas-liquid separator, which removes the condensate from the gas stream. The removed water can be discarded or repurposed.

The hydrophilic coatings used on condensers are typically porous. Due to their porous nature, these coatings can absorb and entrap contaminants that they come into contact with in addition to the water they are designed to collect. These contaminants include organic and inorganic chemicals. As a result, these coatings and the condensers on which they are applied form ideal locations for microbial proliferation. Together, the organic and inorganic chemicals and microbes can reduce the hydrophilic properties of the coating and even make the coating hydrophobic. Once a coating loses its hydrophilic properties, it no longer wets and wicks condensate from the condenser surface and the condensate may form droplets and disperse within the zero gravity environment.

In some cases, contaminants in a coating can be removed to restore the coating's hydrophilic properties. One way of removing the contaminants includes heating the coating in pure oxygen to burn off the contaminants. Using this process, temperatures ranging from 260° C. (500° F.) to 540° C. (1000° F.) and above may be required to remove certain contaminants from a coating. A coating may need to be exposed to high temperatures for several hours to ensure adequate contaminant removal, depending on the types of contaminants present in the coating. Once the contaminants are removed from the coating, the coating regains its hydrophilic properties and can adequately wet and wick condensation from the condenser.

Some hydrophilic coatings include an antimicrobial biocide to further reduce microbial proliferation on the coating and in the collected condensate. One such antimicrobial hydrophilic coating is described in U.S. Pat. No. 5,305,827, which is incorporated by reference. This particular antimicrobial hydrophilic coating contains silver (I) oxide ($Ag_2O$). Water that comes into contact with the coating reacts with the silver oxide at the coating surface. Due to this reaction, silver ions ($Ag^+$) are released into the water. The silver ions provide antimicrobial properties to the water while remaining safe for human use. Silver ions are toxic to some bacteria, viruses, algae and fungi but do not present a high toxicity factor to humans. Thus, the water that condenses on the condenser surface and comes into contact with the antimicrobial hydrophilic coating exhibits a lower likelihood of microbial proliferation.

While the addition of silver oxide to a hydrophilic coating imparts antimicrobial benefits, it also presents additional challenges when it comes to removing contaminants from the coating and restoring the coating's hydrophilic properties following contamination. Silver oxide begins to decompose at temperatures around 250° C. (480° F.). Exposed to air at and above this temperature, silver oxide decomposes to pure silver. Pure silver does not possess the antimicrobial properties of silver oxide. When water encounters pure silver, silver ions ($Ag^+$) are not released in a quantity sufficient to provide antimicrobial activity. Thus, if the restoration process described above in which the coating is heated to temperatures ranging from 250° C. to 540° C. is used on a coating containing silver oxide, the silver oxide decomposes to silver and the coating's biocidal property is lost.

Applicants hypothesized that it might be possible to use ozone to oxidize silver in a hydrophilic coating (the silver resulting from the decomposition of $Ag_2O$) to reform $Ag_2O$ and restore the coating's biocidal properties. Ozone oxidizes the silver according to the equation:

$$2Ag_{(s)} + O_{3(g)} \rightarrow Ag_2O_{(s)} + O_{2(g)} \tag{1}$$

While Applicants were able to discover conditions that allowed sufficient reformation of $Ag_2O$, they also found that several competing reactions required management in order to be able to restore a silver oxide-containing hydrophilic coating.

Applicants discovered that when exposed to temperatures at or above 480° C. (900° F.) for extended periods of time, silver begins to irreversibly integrate itself within and bind to the coating. Once silver binds with the coating, it cannot be treated further to reform silver oxide. Thus, exposing a silver oxide-containing hydrophilic coating to high temperatures for extended periods of time to remove contaminants will permanently remove the biocidal properties of the coating. As a result of this discovery, non-heating approaches to contaminant removal were investigated but did not prove successful enough.

Another potential competing reaction of concern is the conversion of silver oxide to silver sulfide and silver sulfate. If a silver oxide-containing hydrophilic coating is heated in an environment that contains sulfur, silver oxide ($Ag_2O$) can react with the sulfur to form silver sulfide ($Ag_2S$). The formed silver sulfide can later convert to silver sulfate ($Ag_2SO_4$). Silver sulfate cannot be easily converted back to silver oxide. Thus, the formation of silver sulfate reduces the biocidal properties of the coating.

Based on the complications presented by these competing reactions, Applicants experimented with controlled exposures to high temperatures for contaminant removal from silver oxide-containing hydrophilic coatings. Applicants discovered that contaminants could be removed and a silver oxide-containing hydrophilic coating restored while maintaining the coating's biocidal properties using the following approach.

The FIGURE illustrates a schematic of one embodiment of a method for restoring a silver oxide-containing hydrophilic coating. As shown in the FIGURE, method 10 includes heating the coating to about 400° C. in the presence of oxygen, adding ozone, heating the coating to about 480° C. and holding the coating at that temperature for between about 1 hour and about 4 hours, reducing the temperature of the coating to about 400° C. and holding the coating at that temperature for between about 15 minutes and about 4 hours, cooling the coating to ambient temperature and eliminating ozone exposure below about 150° C. In one example, the coating is present on the surface of a condensing heat exchanger. The heat exchanger and coating are placed within a chamber in which temperature and atmospheric conditions can be controlled during the steps of method 10.

In heating step 12 of method 10, the coating is heated from ambient temperature to about 400° C. (750° F.) in the presence of oxygen. During heating step 12, care is taken to keep potential contaminants such as sulfur out of the heating environment. In the embodiment illustrated in the FIGURE, the coating is heated to about 400° C. In other embodiments, the coating is heated between about 260° C. and about 540° C. In exemplary embodiments, the coating is heated between about 370° C. and about 510° C.

Ozone is added in ozone addition step 14 of method 10. Once the coating has reached a temperature of about 400° C., ozone is introduced into the chamber containing the coating. Ozone is added to the chamber in an amount to provide a stoichiometric excess of ozone according to reaction 1 above. Following ozone addition step 14, the chamber contains an environment of oxygen and ozone. As in heating step 12, care is taken to keep potential contaminants such as sulfur out of the heating environment during ozone addition step 14. In the embodiment illustrated in the FIGURE, ozone is introduced to the chamber once the coating has reached a temperature of about 400° C. In other embodiments, ozone is introduced once the coating has reached a temperature between about 370° C. (700° F.) and about 425° C. (800° F.).

Once ozone has been introduced, the coating is heated further to a temperature of about 480° C. in contaminant removal step 16 of method 10. During contaminant removal step 16, contaminants present within the coating are ashed out of the coating. The coating is held at elevated temperature for a period of time sufficient to remove appreciable quantities of any contaminants within the coating. Silver oxide present in the coating may decompose to pure silver during contaminant removal step 16. The presence of ozone within the chamber may limit decomposition of silver oxide and encourages reformation of silver oxide from silver according to reaction 1 above. In the embodiment illustrated in the FIGURE, the coating is maintained at this temperature in the presence of oxygen and ozone for about 2 hours. In another embodiment, the coating is heated to a temperature between about 260° C. and about 540° C. and held at that temperature for less than 24 hours. In other embodiments, the coating is heated to a temperature between about 260° C. and about 540° C. and held at that temperature between about 1 hour and about 4 hours. The temperature and hold time of contaminant removal step 16 can be adjusted based on expected contaminants and the temperatures and times needed for their effective removal from the coating. Lower temperatures can be used for hydrocarbon contaminants, while higher temperatures may be needed for contaminants such as silicones. Longer hold times (24 hours) can be used for lower temperatures, while shorter hold times (1 to 4 hours) are suitable for higher temperatures as the competing reactions described above are time and temperature dependent. In any case, exposure to high temperature during contaminant removal step 16 is minimized to prevent silver within the coating from irreversibly integrating within and binding with the coating.

After maintaining the coating at an elevated temperature in contaminant removal step 16, the coating is cooled to a temperature of about 400° C. in silver oxide restoration step 18. During silver oxide restoration step 18, silver present in the coating is given time to react with ozone at a lower temperature than in contaminant removal step 16 to reform silver oxide. While silver oxide decomposition is minimized and ozone reacts with silver to reform silver oxide during contaminant removal step 16, additional silver reacts with ozone to reform silver oxide during silver oxide restoration step 18. The reformation of silver oxide from silver proceeds according to reaction 1 above. By reforming silver oxide, the biocidal properties of the coating are restored. The coating is held at the reduced temperature for a period of time sufficient to form appreciable quantities of silver oxide within the coating. In the embodiment illustrated in the FIGURE, the coating is maintained at a temperature of about 400° C. in the presence of oxygen and ozone for about 2 hours. In other embodiments, the coating is cooled to a temperature between about 200° C. (390° F.) and about 425° C. and held at that temperature between about 15 minutes and about 4 hours. This range of hold time for silver oxide restoration step 18 provides a combined hold time (of contaminant removal step 16 and silver oxide restoration step 18) of about 1 hour to about 24 hours. The temperature and hold time of silver oxide restoration step 18 can be adjusted based on the amount of silver present in the coating. Prolonged exposure to elevated temperatures during silver oxide restoration step 18 is avoided to prevent silver within the coating from irreversibly integrating within and binding with the coating.

After maintaining the coating at an elevated temperature in silver oxide restoration step 18, the coating is cooled to ambient temperature in cooling step 20. The coating can be passively cooled by eliminating the application of thermal energy and allowing the coating to equilibrate to ambient temperature. Alternatively, the coating can be actively cooled to reduce the coating temperature to ambient temperature. Once the coating temperature is below about 150° C. (300° F.), ozone is removed from the chamber in ozone removal step 22. At this temperature and below, the coating is not exposed to ozone in order to prevent formation of silver (II) oxide (AgO) from silver (I) oxide ($Ag_2O$) and other undesirable silver compounds. In other embodiments, ozone is removed from the chamber once the coating temperature is about 200° C. Ozone can be removed from the chamber by flooding it with oxygen. Once the ozone has been removed from the chamber, the coating continues to cool until it reaches ambient temperature. Following application of method 10, the restored coating contains lower amounts of contaminants while the biocidal properties of the coating are preserved by minimizing decomposition of $Ag_2O$ and taking steps to reform $Ag_2O$ following contaminant removal.

Applicants found that a test panel with a fresh silver oxide-containing hydrophilic coating and a test panel with a silver oxide-containing hydrophilic coating subjected to contamination and then processed according to method 10 both exhibited the required hydrophilic and biocidal properties. The coating of one test panel was contaminated with a silicone, a contaminant that causes the hydrophilic coating to become hydrophobic and a contaminant that is difficult to remove from the coating. The contaminated test panel was then processed according to method 10, described above. Initial and long-term dissolution rates of silver ions ($Ag^+$) confirmed that both the fresh (uncontaminated and untreated) test panel and the treated test panel provided acceptable elution of silver ions to provide biocidal control. Additionally, Applicants found that the treated test panel demonstrated improved adhesion of the silver oxide to the hydrophilic coating, evident based on total silver dissolution rates. The improved adhesion of silver oxide to the hydrophilic coating may potentially enhance the life of the biocidal properties of the hydrophilic coating. This testing confirmed that method 10 provides a suitable method for restoring a silver oxide-containing hydrophilic coating.

Several cycles of method 10 can be applied to a silver oxide-containing hydrophilic coating. While prolonged exposure to high temperatures causes silver oxide to decompose to silver and irreversibly integrate and bind with a hydrophilic coating, method 10 minimizes the coating's exposure to temperatures that cause decomposition and binding. As a result, method 10 can be reapplied to a silver oxide-containing hydrophilic coating following additional use and contamination of the coating several times before the silver oxide concentration becomes too low to provide a beneficial biocidal effect. Manufacturing condensing heat exchangers with silver oxide-containing hydrophilic coatings for use in zero gravity environments is a costly and time-consuming process. Method 10 allows for the restoration of the coating that provides considerable cost and time savings.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. A method for restoring a silver oxide-containing hydrophilic coating, the method comprising:
   heating the coating to a first temperature between about 260° C. and about 540° C. in a chamber during a heating step;
   adding ozone to the chamber;
   maintaining the coating at a second temperature between about 260° C. and about 540° C. in an environment containing oxygen and ozone for less than 24 hours during a contaminant removal step; and
   reducing the temperature of the coating to a third temperature lower than the second temperature and maintaining the coating at the third temperature for between about 15 minutes and about 4 hours during a silver oxide restoration step.

2. The method of claim 1, wherein the first temperature is between about 370° C. and about 510° C.

3. The method of claim 1, wherein ozone is added to the chamber once the coating has reached a temperature above about 370° C.

4. The method of claim 1, wherein the coating is maintained at the second temperature for between about 1 hour and about 4 hours during the contaminant removal step.

5. The method of claim 1, wherein the environment contains ozone at a concentration equal to or greater than a stoichiometric amount for the following reaction:

$$2\,Ag + O_3 \rightarrow Ag_2O + O_2.$$

6. The method of claim 1, further comprising:
   cooling the component to ambient temperature; and
   eliminating exposure of the coating to ozone once the coating reaches a temperature below about 150° C.

7. The method of claim 6, wherein exposure of the coating to ozone is eliminated once the coating reaches a temperature below about 200° C.

8. A method for preparing a component having a silver oxide-containing hydrophilic coating, the method comprising:
   heating the component to a first temperature between about 370° C. and about 540° C.;
   adding ozone to the component once the component has reached a temperature between about 370° C. and about 425° C.;
   maintaining the component at the first temperature for between about 1 hour and about 4 hours in an environment containing oxygen and ozone to eliminate contaminants from the coating;
   reducing the temperature of the component to a second temperature between about 260° C. and about 510° C.; and
   maintaining the component at the second temperature for between about 15 minutes and about 4 hours in the environment containing oxygen and ozone to restore silver oxide in the coating.

9. The method of claim 8, wherein the first temperature is between about 400° C. and about 510° C.

10. The method of claim 8, wherein the second temperature is between about 370° C. and about 425° C.

11. The method of claim 8, wherein the coating is exposed to an environment consisting of oxygen and ozone while the component is at a temperature above about 370° C.

12. The method of claim 8, further comprising:
   reducing the temperature of the component to ambient temperature after maintaining the component at the second temperature, wherein the coating is exposed to an environment substantially free of ozone once the component is at a temperature below about 200° C.

13. The method of claim 8, wherein the environment contains ozone at a concentration equal to or greater than a stoichiometric amount for the following reaction:

$$2\,Ag + O_3 \rightarrow Ag_2O + O_2.$$

14. A method for restoring a condensing heat exchanger having an antimicrobial hydrophilic coating, the method comprising:
   heating the heat exchanger to a first temperature between about 370° C. and about 540° C.;
   maintaining the heat exchanger at the first temperature for less than about 24 hours in an environment containing oxygen and ozone to eliminate contaminants from the coating;
   reducing the temperature of the heat exchanger to a second temperature between about 260° C. and about 510° C.; and
   maintaining the heat exchanger at the second temperature for between about 15 minutes and about 4 hours in the environment containing oxygen and ozone to reform silver oxide.

15. The method of claim 14, wherein the first temperature is between about 400° C. and about 510° C.

16. The method of claim 14, wherein the second temperature is between about 370° C. and about 425° C.

17. The method of claim 14, wherein the coating is exposed to an environment consisting of oxygen and ozone while the heat exchanger is at a temperature above about 370° C.

18. The method of claim 14, further comprising:
   reducing the temperature of the heat exchanger to ambient temperature after maintaining the component at the second temperature, wherein the coating is exposed to an environment substantially free of ozone once the component is at a temperature below about 200° C.

19. The method of claim 14, wherein the environment contains ozone at a concentration equal to or greater than a stoichiometric amount for the following reaction:

$$2\,Ag + O_3 \rightarrow Ag_2O + O_2.$$

* * * * *